JOHN S. WARD.

Improvement in Churns.

No. 121,560.

Patented Dec. 5, 1871.

Witnesses.

John L. Cox
Dennis Finning

Inventor.

John Stockton Ward
By his attys.
Cox and Cox 121,560

UNITED STATES PATENT OFFICE.

JOHN STOCKTON WARD, OF PLATTSBURG, MISSOURI.

IMPROVEMENT IN CHURNS.

Specification forming part of Letters Patent No. 121,560, dated December 5, 1871.

*To all whom it may concern:*

Be it known that I, JOHN STOCKTON WARD, of Plattsburg, Missouri, have invented a new and useful Improvement in Churns, of which the following is a specification:

The invention relates to that class of churns in which the air is forced through metallic tubes into the body of the milk or cream, the tubes being so placed as to revolve with a horizontal frame attached to a vertical shaft, the shaft being actuated by a crank and gear-wheels. The object of the invention is to utilize air in the process of churning, and to facilitate the formation of butter thereby.

Figure 1:
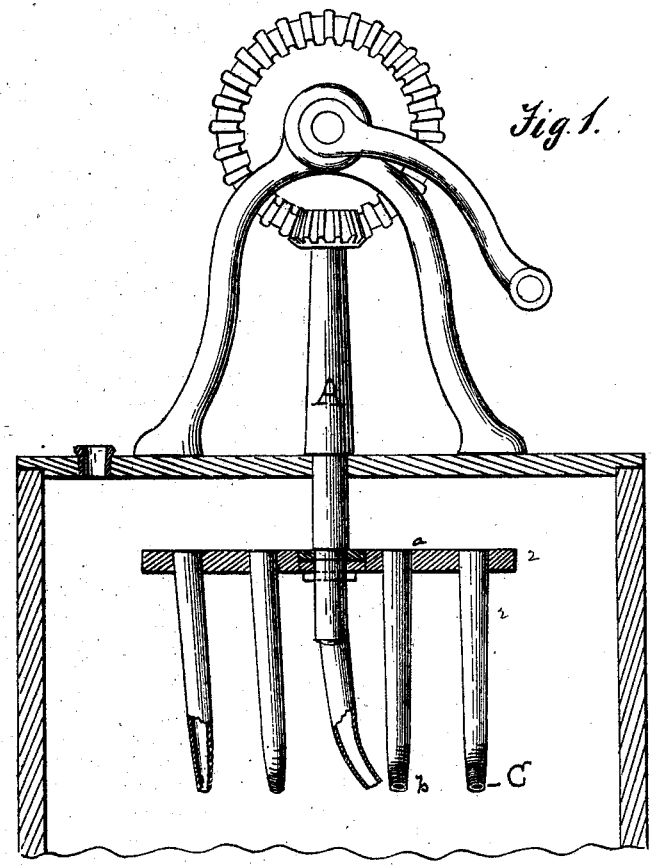
Figure 2:
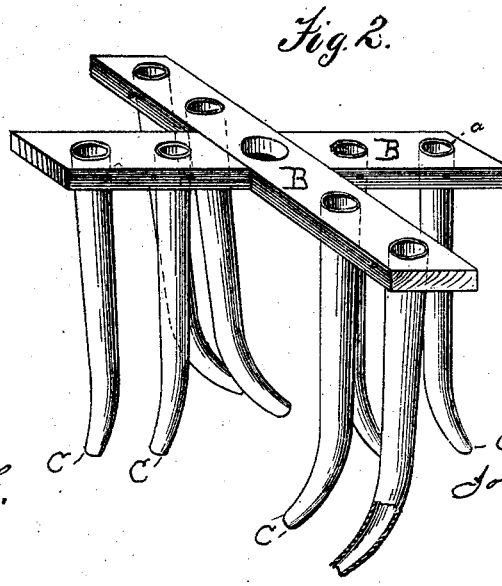

Figure 1 is a vertical transverse section of a device embodying the elements of the invention. Fig. 2 is a perspective view of the rotary dasher.

A is a shaft that is suspended in any suitable manner in a vertical position, its lower extremity passing through a hole in the top of the churn-box. This shaft is so constructed as to admit of its being readily turned, which may be effected by means of cog or miter wheels, as shown, or otherwise. To the lower extremity of the shaft A two or more cross-arms, B B, are rigidly attached in a horizontal position, and so arranged as to revolve within the churn-box. In the cross-arms B B I insert the atmospheric tubes C C at ch intervals and in such numbers as appear to be expedient, placing them in a vertical position and securing them firmly in their places. These atmospheric tubes consist of a metallic tube or pipe open at both ends. The upper end *a*, which is the end held by the cross-arms B and is made of a size adapted to the proportions of the churn-box, is somewhat larger than the end *b*, the tube being constructed so as to taper, or being made of one size to a certain point and then tapered. The lower part of the tube is curved so as to bring the lower end *b* into a nearly horizontal position. As stated, both ends of these tubes are open, so that when the arms B B are turned the air is caught at the upper end of the tubes and forced down into the cream or milk, thus causing the greatest agitation.

In the arrangement of the tubes care should be taken to so construct them that their lower ends will occupy a position as near the bottom of the churn-box as may be practicable, and also to place the cross-arms B B sufficiently above the cream or milk to prevent its being thrown in too great quantities into the top of the tubes.

In the present device I have used but a limited number of tubes; but any number may be employed, according to pleasure. The tubes, too, may be made in any desired shape, either round, as shown, or in angular form, so as the more readily to cut the milk or cream during the act of churning.

The top of the churn-box is arranged in such a manner as to admit of its being secured in its place by means of pins or otherwise, and air-holes are cut in it at suitable points.

What I claim as my invention, and desire to secure by Letters Patent, is—

The dasher suspended in the barrel, as shown, and constructed of the vertical shaft A provided with the arms B, to which are secured in a vertical position the air-tubes C having their lower extremities reduced in diameter and curved backward, substantially as shown and described.

In testimony that I claim the foregoing improvement in churns as above described I have hereunto set my hand and seal this 19th day of September, 1871.

JOHN STOCKTON WARD. [L. S.]

Witnesses:
 MIDDLETON N. JONES,
 JAMES GANT.

(45)